United States Patent [19]
Robinson

[11] Patent Number: 5,487,026
[45] Date of Patent: Jan. 23, 1996

[54] MULTIPLYING DEVICE, LINEAR ALGEBRAIC PROCESSOR, NEUROMORPHIC PROCESSOR, AND OPTICAL PROCESSOR

[75] Inventor: Michael G. Robinson, Stadhampton, United Kingdom

[73] Assignee: Sharp Kabushiki Kaisha, Osaka, Japan

[21] Appl. No.: 28,834

[22] Filed: Mar. 10, 1993

[30] Foreign Application Priority Data

Mar. 10, 1992 [GB] United Kingdom ............... 9205161

[51] Int. Cl.⁶ ................................................. G06G 7/16
[52] U.S. Cl. ................................................. 364/841
[58] Field of Search ........................... 364/841, 845, 364/822, 827, 837, 807; 359/72, 48, 100; 395/24

[56] References Cited

U.S. PATENT DOCUMENTS

| | | | |
|---|---|---|---|
| 4,213,810 | 7/1980 | Heynisch et al. | 156/73.1 |
| 4,232,947 | 11/1980 | Funada et al. | 350/341 |
| 4,256,787 | 3/1981 | Shauer et al. | 428/1 |
| 4,370,194 | 1/1983 | Shauer et al. | 156/643 |
| 4,521,080 | 6/1985 | Funada et al. | 350/341 |
| 4,603,398 | 7/1986 | Bocker et al. | 364/841 |
| 4,779,235 | 10/1988 | Kubota | 365/234 |
| 4,800,519 | 1/1989 | Grinberg et al. | 364/841 |
| 5,177,628 | 1/1993 | Moddel | 359/72 |

FOREIGN PATENT DOCUMENTS

| | | |
|---|---|---|
| 0265194 | 4/1988 | European Pat. Off. |
| 2166258 | 4/1986 | United Kingdom. |
| 2219179 | 12/1989 | United Kingdom. |
| 2231989 | 11/1990 | United Kingdom. |
| 2255427 | 11/1992 | United Kingdom. |

OTHER PUBLICATIONS

Y. Nitta et al, Japanese Journal of Applied Physics, vol. 28, No. 11, Nov., 1989, pp. L2101–2103, "GaAs/AlGaAs Optical Interconnection Chip for Neural Network".

*Primary Examiner*—Tan V. Mai

[57] ABSTRACT

A linear algebraic processor is provided, for instance for performing vector matrix multiplications as part of a neural network. Light emitting diode strips 4 are formed on one substrate 1 and are illuminated in accordance with the values of elements of an input vector. Photodiode strips 8 are arranged orthogonally to the light emitting diode strips 4 on another substrate 2. A ferro-electric liquid crystal layer 3 is disposed between the strips 4 and 8 and provided with polarisers and electrodes 7 and 9 to permit the light attenuation properties of each matrix element between facing portions of the light emitting diode strips 4 and photodiode strips 8 to be varied and stored in a non-volatile way. The optical attenuation represents the value of the elements of the matrix and the outputs of the photodiode strips 8 represent the value of the elements of an output vector formed as the product of the input vector and the matrix. The optical attenuation of the ferro-electric liquid crystal can be incremented or decremented by applying suitable voltages to the electrodes so as to create electric fields across the liquid crystal matrix elements.

22 Claims, 1 Drawing Sheet

MULTIPLYING DEVICE, LINEAR ALGEBRAIC PROCESSOR, NEUROMORPHIC PROCESSOR, AND OPTICAL PROCESSOR

BACKGROUND OF THE INVENTION

The present invention relates to a multiplying device, a linear algebraic processor, a neuromorphic processor, and and optical processor.

In the technical field of artificial intelligence, it is known to provide so-called "neural networks" which mimic the operation of small networks of neurons in an animal brain. Such neural networks include neuromorphic linear algebraic processors which are capable of being taught to perform various functions, for instance in the field of pattern recognition. The linear algebraic processors are required to perform vector matrix multiplications, effectively in parallel with the matrix elements being updated effectively in parallel for the purpose of teaching the network to perform its intended function.

Although it is possible to simulate the operation of a neural network by means of a conventional programmed data processor, the speed of operation is severely limited because of the essentially serial operation of such arrangements. In order to overcome this problem, dedicated electronic devices have been provided in which the matrix multiplication and updating of matrix elements are performed in parallel. Such devices may employ digital circuitry, in which the matrix elements are stored in binary format, or analog circuitry, in which conventional charge storage devices such as capacitors or charge coupled devices store the matrix elements. However, the semi-conductor devices of these types require relatively large silicon substrate areas for implementation and relatively large numbers interconnections for parallel updating.

Alternative type of processor is disclosed in an article entitled "GaAs/AlGaAs Optical Interconnection Chip for Neural Network" in the Japanese Journal of Applied Physics, Volume 28, No. 11, Nov. 1989, pages L2101 to L2103 by Y. Nitta, J. Ohta, K. Mitsunaga, M. Takahashi, S. Tai and K. Kyuma. The device disclosed in this article uses arrays of light emitters and facing light detectors separated by a fixed mask of transparent and opaque regions. The elements of an input vector are applied to strips of light emitters whereas the elements of the output vector are formed by orthogonal strips of light detectors. Light from each element of each strip emitter is modulated or attenuated by the mask before being received by a facing portion of an orthogonal light detector, so that the matrix elements for the matrix multiplications are formed by the light transmissive properties if the elements of the mask. Thus, this arrangement is capable of performing a fixed algebraic operation but, after manufacture, cannot be adapted or taught to perform other operations.

SUMMARY OF THE INVENTION

According to a first aspect of the invention, there is provided a multiplying device comprising an electro-optical emitter, and opto-electric transducer, and a controllable attenuator having controllable non-volatile attenuation to optical radiation and being disposed between the emitter and the transducer.

It is thus possible to perform multiplication optically, for instance using visible light or infra-red radiation.

The emitter may be a semi-conductor light emitter, such as a light emitting diode. The detector may be a semi-conductor photo-detector, such as a photo diode.

Preferably the controllable attenuator comprises a liquid crystal having non-volatile variable optical attenuation and means for varying the optical attenuation. The liquid crystal preferably has a substantially continuously variable optical attenuation. The liquid crystal may be a ferro-electric liquid crystal and the means for varying the optical attenuation may comprise electrodes for injecting charge into the ferro-electric liquid crystal. However, other types of liquid crystal may be used, such as anti-ferro-electric liquid crystals and liquid crystal polymers.

According to a second aspect of the invention, there is provided a linear algebraic processor comprising a plurality of multiplying devices in accordance with the first aspect of the invention.

The multiplying devices may be arranged in a one-dimensional array. The emitters of the multiplying devices may comprise portions of a strip emitter. Alternatively, the transducers of the multiplying devices may comprise portions of a strip detector. Such processors may be used to perform multiplication operations on vectors.

The multiplying devices may be arranged in a two-dimensional array. Such a processor may be thus used to perform matrix multiplication operations. The emitters of the multiplying devices may comprise portions of the strip emitters aligned in a first of the dimensions of the array, so as to perform multiplication of an input vector by a matrix. The transducers of the multiplying devices may comprise portions of a strip detector aligned in a second of the dimensions of the array, so as to provide an output vector from a matrix multiplication.

According to a third aspect of the invention, there is provided a neuromorphic processor including a linear algebraic processor in accordance with the second aspect of the invention. Such a neuromorphic processor may be arranged to operate as a neural network, for instance by including means for performing a non-linear operation on the output of the linear algebraic processor.

According to a fourth aspect of the invention, there is provided an optical processor including an optical matrix attenuator having a plurality of cells, each of which comprises a controllable attenuator having controllable non-volatile attenuation to optical radiation and being disposed in an optical radiation parkway of the optical processor.

The controllable attenuator may comprise a liquid crystal having non-volatile variable optical attenuation and means for varying the optical attenuation. Preferably the liquid crystal has a substantially continuously variable optical attenuation. The liquid crystal may be a ferro-electric liquid crystal and the means for varying the optical attenuation may comprise electrodes for injecting charge into the ferro-electric liquid crystal. Charge injection results in the switching of bistable domains such that the average transmission over the area of a matrix element can be incremented or decremented in a pseudo-analogue fashion. However, other types of liquid crystals, such as anti-ferro-electric liquid crystals and liquid crystal polymers, may be used.

It is thus possible to provide devices and processors in which multiplication is performed optically by a co-efficient which can be varied. In the case of processors employing a plurality of multiplying devices, vector and matrix multiplication may be performed in parallel with the elements or coefficients being adaptable. By using liquid crystals to store the elements in a non-volatile manner, very little power consumption is required in order to adapt and store the elements. Further, little or no electronic circuitry is required for these functions so that relatively small substrate areas on integrated circuits forming the processors are required. Also, the interconnection requirements for parallel updating of the elements are relatively low, thus easing the packaging and external electrode needs.

BRIEF DESCRIPTION OF THE DRAWINGS

The invention will be further described, by way of example, with reference to the accompanying drawings, in which.

BRIEF DESCRIPTION OF THE PREFERRED EMBODIMENTS

Figure 1:
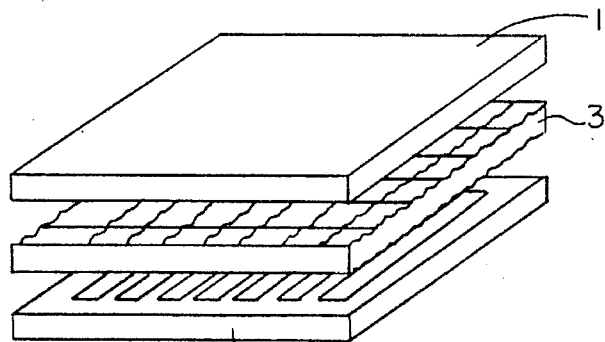
FIG. 1 is a schematic of a neuromorphic linear algebraic processor constituting an embodiment of the invention.

The processor illustrated in FIG. 1 comprises a semiconductor substrate 1, for instance made of gallium arsenide, on whose lower surface are formed parallel strips of light emitting diodes. The strips are connected to electrodes (not shown) for supplying current to the light emitting diode strips. The input currents may represent binary data such as that, for instance, a binary 1 is represented by light emission and a binary zero is represented by no light emission. It is also possible for the current supplied to the electrodes, and hence the amount of light emitted by the light emitting diode strips, to represent analogue quantities. In either case, the input to the processor may be considered as an input vector whose elements are either binary digits or analog quantities.

The processor further comprises a semi-conductor substrate 2, for instance of gallium arsenide, on whose upper surface are formed light detectors 8 in the form of photo-diode strips arranged parallel to each other and orthogonal to the light emitting diode strips on the lower surface of substrate 1. The photo-diode strips 8 are connected to electrodes (not shown) which provide output voltages or currents representing the elements of an output vector. These elements may also represent binary digits or analogue coefficients of the output vector, depending upon the application.

The processor further comprises a liquid crystal layer 3 disposed between the light emitting diode strips and the photo-diode strips 8. The liquid crystal layer 3 acts as a spatial light modulator and may be notionally divided into a rectangular grid of elements, each of which controls the attenuation of light traveling from a portion of a light emitting diode strip immediately above the element to a portion of a photo-detector strip 8 immediately below the element. The light attenuation properties of these matrix elements are individually adjustable and are non-volatile, so that the liquid crystal stores a matrix of coefficients whose values may be adapted or altered effectively in parallel.

Any liquid crystal having the appropriate properties may be used for the layer 3. For instance, the liquid crystal may comprise a ferro-electric liquid crystal with associated polarisers such that the light attenuation properties are non-volatile but may be altered by charge injection by means of electrodes disposed on opposite sides of the layer 3. However, other types of liquid crystal may be used, such as anti-ferro-electric liquid crystals and liquid crystal polymers with appropriate means for altering or adapting the light attenuation properties of the matrix elements. It is also possible to use nematic liquid crystals but, as such liquid crystals have volatile light attenuation properties, further electronic circuitry would be required in order to produce non-volatile elements and this would increase the semiconductor substrate area required and the interconnection requirement of the processor. Thus, at present, ferro-electric liquid crystals are preferred.

Figure 2:
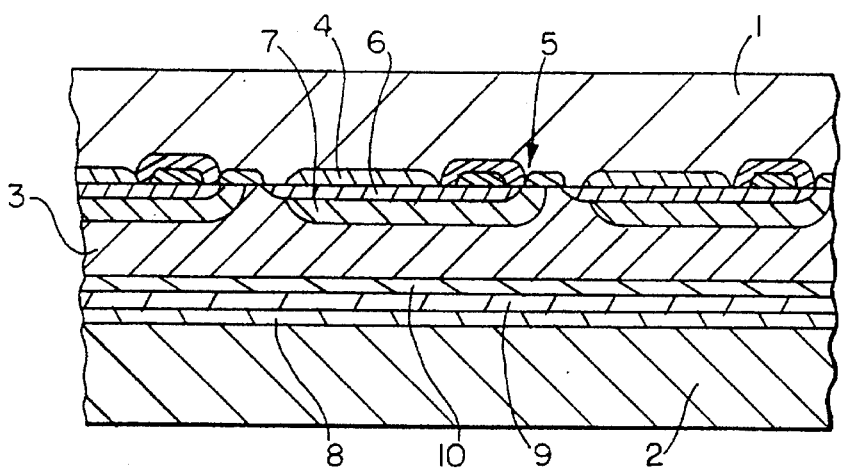
FIG. 2 shows a cross of the processor of FIG. 1.

FIG. 2 shows (not to scale) in more detail the structure of the processor. The section is taken perpendicular to the light emitting diode strips and longitudinally through one of the photodiode strips. The substrate 1 has formed therein elongate strips 4 representing the light emitting diode strips, together with associated structures 5, all of which are formed by conventional monolithic integrated circuit fabrication techniques. Insulating layers 6 cover the light emitting diode strips 4 and, together with layers 7, provide isolation from and alignment to the ferro-electric liquid crystal 3. The insulating layer 6 and the polarisation layer 7 are substantially transparent to the radiation, such as visible light or infra-red, of the desired polarisation emitted by the light emitting diode strips 4.

The photodiode strips 8 are likewise formed by conventional monolithic integrated circuit fabrication techniques on the surface of the substrate 2 and are covered by a polarisation layer 9 and an alignment layer 10. The layers 9 and 10 are likewise transparent to radiation of the desired polarisation from the light emitting diode strips 4.

The layers 7, 9, and 10 together with the ferro-electric liquid crystal 3 form part of the spatial optical modulator and co-operate with each other to provide adjustable non-volatile attenuation of the radiation passing from the light emitting diode strips 4 to the photodiode strips 8. Each of the layers 7 and 9 comprises an elongate electrode and an optical polariser. The electrodes permit the application of suitable voltages for injecting charge into the ferro-electric liquid crystal 3 in order to vary its optical attenuation. The electrodes are arranged as a rectangular grid so as to permit the optical attenuation of each element to be adjusted independently of the other elements. The polarisations of the layers 7 and 9 co-operate with the adjustable optical polarisation rotation of the ferro-electric liquid crystal 3 to provide the variable attenuation.

In use, the processor shown in FIGS. 1 and 2 performs multiplication of an input vector by a matrix, the output appearing as an output vector. For use with digital input vectors, each element of the input vector has a value of 0 or 1 so that the light emitting diode strips 4 associated with the input vector elements having the value 1 are illuminated whereas those associated with the input vector elements having value 0 are not illuminated. Each photodiode strip 8 sums the amount of optical radiation received from all of the light emitting diode strips 4 via the intervening matrix elements of the ferro-electric liquid crystal 3 and thus provides a signal representing the value of one element of the output vector. In practice, some cross-talk may occur i.e. some optical radiation may be received via matrix elements not directly above the photodiode strip. However, such cross-talk is of a sufficiently low level not to be a problem for the sorts of applications for which the processor is intended.

Although the processor may be used simply as a matrix multiplication device, it is more likely to be used as part of a neural network, for instance for pattern recognition applications. This requires an initial process of teaching the neural network to respond in a predetermined way to certain input stimuli, and the teaching process is performed by adjusting the optical attenuation properties of the matrix elements formed by the liquid crystal layer 3. In order to perform this teaching process, a predetermined input vector is applied to the processor and the output vector from the photodiode strips is compared by associated circuitry, fabricated on one of the substrates 1 or 2 or on a separate substrate, with a target vector in order to calculate an error vector. The error vector components are then transformed into voltages which are then applied to the electrodes forming part of the layer 9. Simultaneously, voltages representing the input vector elements are applied to the electrodes in the layer 7. The resulting electric fields which appear across the liquid crystal matrix elements cause charge to be injected into the ferro-electric liquid crystal so as to alter its state by a finite positive or negative amount and hence to alter the light attenuation between facing portions of the light emitting diode strip 4 and the photodiode strip 8. This process is then repeated until the elements of the error vector are all zero or are below respective threshold values.

Figure 3:
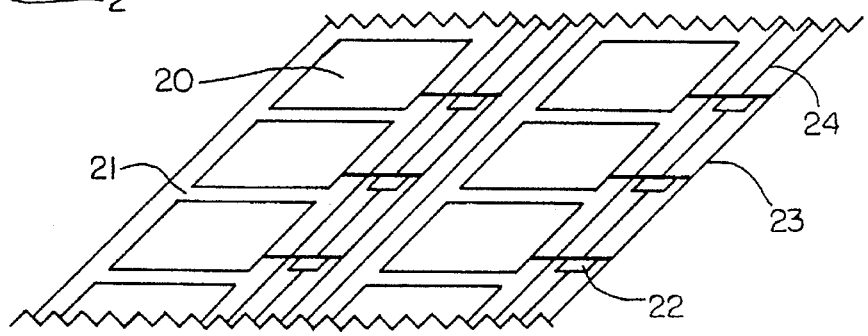
FIG. 3 illustrates schematically part of the lay out of an integrated circuit forming part of the processor of FIG. 1.
Figure 4:
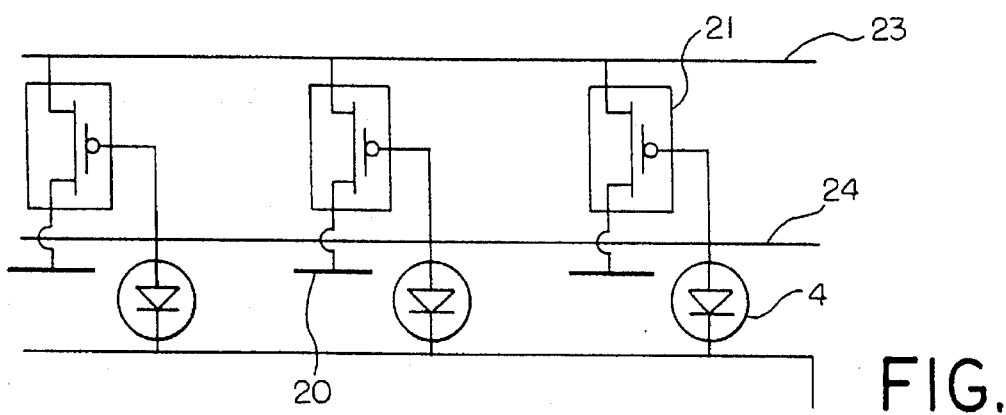
FIG. 4 is a schematic circuit diagram of a portion of the part shown in FIG. 3.

The usual update rule for matrix elements performed within an adaptable linear algebraic processor requires that the change in light attenuation of each matrix element should be proportional to the product of the element of the error vector supplied to the electrode on the photodiode layer and the element of the input vector supplied to the electrode on the light emitting diode strip. However, the field across the ferro-electric liquid crystal of the matrix element is in the form of the sum of a function of the error vector element and a function of the input vector element. In order to approach the ideal incremental or decremental change in optical attenuation, the input vector components may be supplied through a solid state switch which is switched off when no update is required i.e. when the input vector element is equal to zero. Such an arrangement is illustrated in FIGS. 3 and 4.

The light emitting diode strip 4 is fabricated as individual light emitting diodes for each of the matrix elements, the diodes being connected between a common line and an input vector element line 24. The electrodes of the layer 7 are likewise arranged as individual electrodes 20 connected via the source/drain paths of respective insulating gate field effect transistors 21 to an update voltage supply line 23. The gates of the field effect transistors 21 are connected to the line 24.

Thus, when the value of the input vector element associated with the line 24 is equal to one, the light emitting diodes of the strip 4 are illuminated and the field effect transistors 21 are turned on so as to permit updating of the associated matrix elements. However, when the input vector element has a value equal to zero, the light emitting diodes of the associated strip are extinguished and the field effect transistors 21 are turned off so as to isolate the electrodes 20. Thus, the electrodes of the strip are allowed to float to the potential of the opposite electrode on the photodiode strip so that negligible electric field is applied across the ferro-electric liquid crystal matrix element.

During updating of the matrix element, the line 23 receives the appropriate analogue positive, negative, or zero voltage so as to permit the appropriate change in the optical attenuation of the matrix element. This permits the optical attenuation to be incremented or decremented or to remain unchanged. The updated value of the optical attenuation is then held because of the non-volatile properties of the ferro-electric liquid crystal. Thus, very little electric power is required to alter and hold the optical attenuations of the matrix elements. It has been found that this non-volatile storage mechanism is possible through bistable domain formation associated with ferro-electric liquid crystal cell surface microscopic non-uniformity. By forming ferro-electric domains, the liquid crystal traps charge that can be incremented or decremented as described hereinbefore. Thus, once it has been trained, the ferro-electric liquid crystal matrix elements store the analogue matrix values as non-volatile optical attenuation values and the processor may subsequently be used for fast parallel processing of data as part of a neural network or for other applications.

The processor as described hereinbefore and shown in the drawings may be used without substantial additional circuitry in various applications. For instance, it may be used as a mathematical co-processor to solve simple linear algebraic problems, or as a feature extractor and classifier for classifying input patterns by template matching. However, the processor may be used with associated electronic circuitry as part of a neural network. For instance, it may be used to perform vector matrix multiplications followed by non-linearities so as to provide a multi-layer perceptron. Also, more complex layered structures than those shown in the accompanying drawings may be provided. For instance, it is possible to provide a "single chip" implementation of multiple layer networks where optically encoded information passes in both directions through the ferro-electric liquid crystal, which requires optical sources or reflectors on both sides of the liquid crystal. It is also possible to provide a reciprocal chip architecture in which semi-conductor diode structures are used for optical emission and detection. Such an arrangement permits the use of parallel back error propagation.

It is further possible to utilise the ferro-electric liquid crystal layer and the associated polarising and electrode layers in such a way that they form part of an optical processor not necessarily in direct contact with optical emitters and/or optical detectors. In this case, the matrix elements are disposed such that they are in optical pathways within the processor structure.

I claim:

1. A multiplying device comprising an electro-optical emitter which emits optical radiation as a function of a first input signal, an opto-electric transducer, and a controllable attenuator having controllable non-volatile attenuation to optical radiation as a function of a second input signal and being disposed between the emitter and the transducer such that the opto-electric transducer provides an output signal representative of a multiplication of the first and second input signals.

2. A device as claimed in claim 1, in which the emitter is a semiconductor light emitter.

3. A device as claimed in claim 2, in which the semiconductor light emitter is a light emitting diode.

4. A device as claimed in claim 1, in which the transducer is a semiconductor photodetector.

5. A device as claimed in claim 4, in which the semiconductor photodetector is a photodiode.

6. A device as claimed in claim 1, in which the controllable attenuator comprises a liquid crystal having non-volatile variable optical attenuation and means for varying the optical attenuation.

7. A device as claimed in claim 6, in which the liquid crystal has a substantially continuously variable optical attenuation.

8. A device as claimed in claim 6, in which the liquid crystal is a ferroelectric liquid crystal and the means for varying the optical attenuation comprise electrodes for injecting charge into the ferroelectric 9. A linear algebraic processor comprising a plurality of multiplying devices arranged in an array, each of said multiplying devices comprising an electro-optical emitter which emits optical radiation as a function of a first input signal, an opto-electric transducer, and a controllable attenuator having controllable non-volatile attenuation to optical radiation as a function of a second input signal and being disposed between said emitter and said transducer such that the opto-electric transducer provides an output signal representative of a multiplication of the first and second input signals.

10. A processor as claimed in claim 9, in which the multiplying devices are arranged in a one-dimensional array.

11. A processor as claimed in claim 10, in which the emitters of the multiplying devices comprises portions of a strip emitter.

12. A processor as claimed in claim 10, in which the transducers of the devices comprise portions of a strip detector.

13. A processor as claimed in claim 9, in which the multiplying devices are arranged in a two-dimensional array.

14. A processor as claimed in claim 13, in which the emitters of the multiplying devices comprise portions of strip emitters aligned in a first of the dimensions of the array.

15. A processor as claimed in claim 13, in which the transducers of the multiplying devices comprise portions of a strip detector aligned in a second of the dimensions of the array.

16. A processor as claimed in claim 9 wherein each of said controllable attenuators is controlled individually.

17. A neuromorphic processor comprising a linear algebraic processor having a plurality of multiplying devices arranged in an array, each of said multiplying devices comprising an electro-optical emitter which emits optical radiation as a function of a first input signal, an opto-electric transducer, and a controllable attenuator having controllable non-volatile attenuation to optical radiation as a function of a second input signal and being disposed between the emitter and the transducer such that the opto-electric transducer provides an output signal representative of a multiplication of the first and second input signals.

18. An optical processor including an optical matrix attenuator having a plurality of cells arranged in an array, each of which comprises a controllable attenuator having controllable non-volatile attenuation to optical radiation and being disposed in an optical radiation pathway of the optical processor.

19. An optical processor as claimed in claim 18, in which the controllable attenuator comprises a liquid crystal having non-volatile variable optical attenuation and means for varying the optical attenuation.

20. An optical processor as claimed in claim 19, in which the liquid crystal has a substantially continuously variable optical attenuation.

21. A processor as claimed in claim 19, in which the liquid crystal is a ferroelectric liquid crystal and the means for varying the optical attenuation comprise electrodes for injecting charge into the ferroelectric liquid crystal.

22. An optical processor as claimed in claim 17 wherein each of said controllable attenuators is controlled individually.

* * * * *